Feb. 16, 1926.
P. F. GATES
STEERING WHEEL GRIP
Filed March 16, 1925
1,572,995
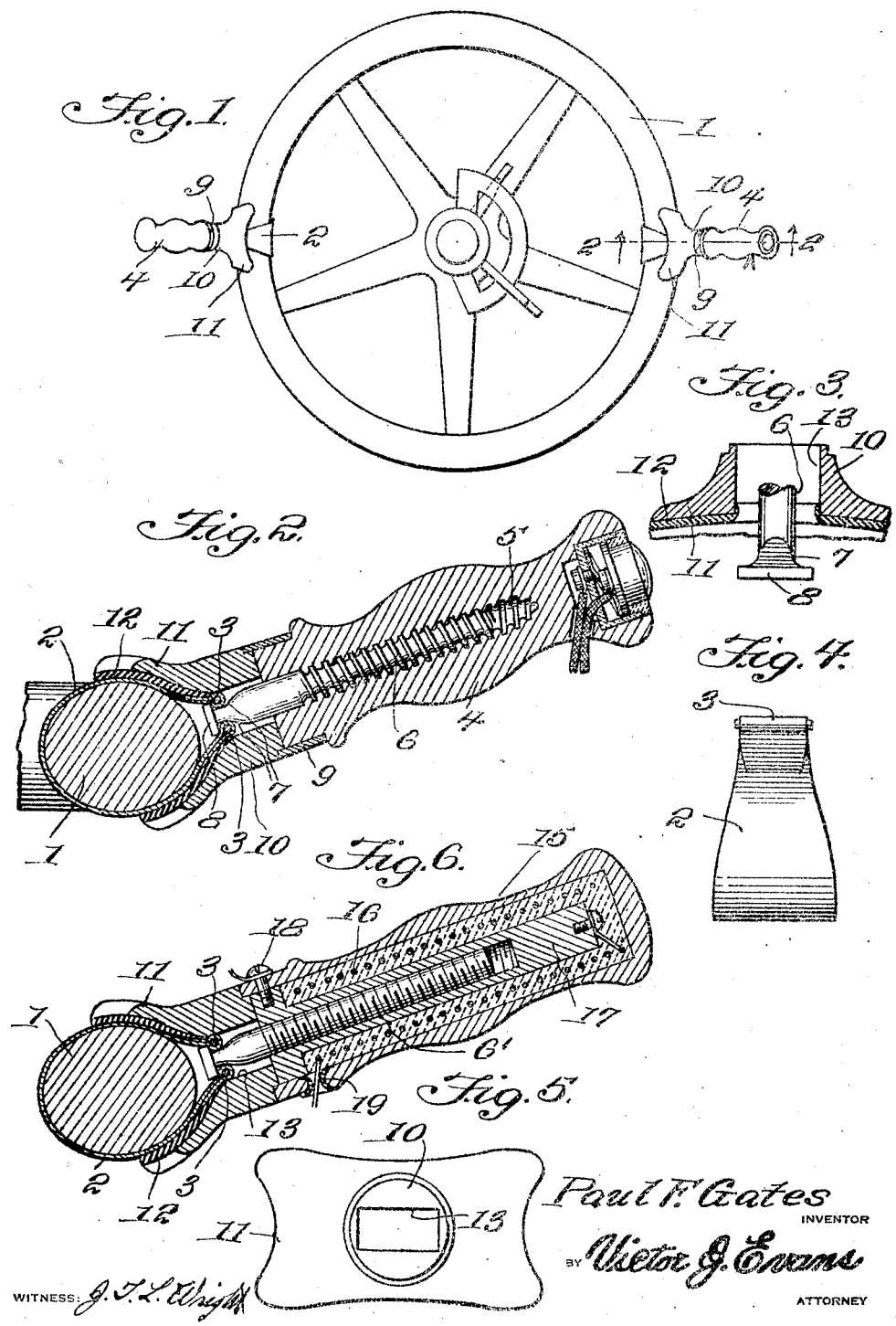

Patented Feb. 16, 1926.

1,572,995

UNITED STATES PATENT OFFICE.

PAUL F. GATES, OF PORTLAND, OREGON.

STEERING-WHEEL GRIP.

Application filed March 16, 1925. Serial No. 15,986.

*To all whom it may concern:*

Be it known that I, PAUL F. GATES, a citizen of the United States, residing at Portland, in the county of Multnomah and State of Oregon, have invented new and useful Improvements in Steering-Wheel Grips, of which the following is a specification.

The object of this invention is to provide the steering wheel of an automobile with outwardly projecting handle members to facilitate the steering of the machine, and likewise to relieve the hands of the operator from the necessity of tightly gripping the wheel and to obviate the cramping of the muscles incident to such gripping.

A further object is the provision of a handle that is adjustably and removably secured on the rim of the steering wheel of an automobile so that the same can be conveniently positioned with respect to the operator and readily grasped to insure the positive and easy steering of the machine.

A still further object is the provision of a steering wheel grip which may have arranged therein a heating coil so that the hand of the operator will be retained in a warm condition when driving in wintry weather.

The invention further consists in the novel construction, combination and operative association of parts such as is disclosed by the drawings which accompany and form part of this application.

In the drawings:—

Figure 1 is a top plan view of a steering wheel provided with the improvement.

Figure 2 is an enlarged sectional view approximately on the line 2—2 of Figure 1.

Figure 3 is a sectional view through the yoke of the improvement, showing the head of the screw in a position to release or to grip the split band clip.

Figure 4 is a side elevation of the clip.

Figure 5 is a plan view of the yoke of the improvement.

Figure 6 is a sectional view similar to Figure 2, but showing the grip having a heating coil therein.

While my improvement is primarily devised for use by automobilists in steering an automobile, the same can be readily attached to the steering wheels of other vehicles.

Referring now to the drawings in detail, the numeral 1 designates the steering wheel of an automobile.

In the showing of Figure 1 of the drawings, the steering wheel 1 has clamped thereon two grips in accordance with this invention, although only one of such grips may be employed.

Arranged around the rim of the wheel 1 there is a split metal clip 2. The clip has its ends rounded upon itself to provide beads 3. These beads preferably receive therethrough suitable rods for sustaining the same at all times in proper shape.

The handle of the clip is indicated by the numeral 4, the same having therein a threaded bore 5. This bore is designed to receive therein the threads of a lag screw 6. The screw is of a length to project beyond the handle 4, and has its outer and non-threaded end rounded or dished inwardly, as at 7, to provide an outer flat head 8. The reduced outer end of the handle 4 has arranged therearound a ferrule 9, the said ferrule also engaging an annular depression in the central and rounded body portion 10 of a yoke 11. The inner face of the yoke has preferably arranged thereon a sheet of compressible material, indicated by the numeral 12. The yoke is designed to receive the split ends of the clamp 2 therein. The lag screw 6 is initially partly withdrawn from the threaded bore 5 of the handle 4, so that the head 8 thereof will be arranged to engage the beads 3 on the ends of the clip. The handle is then turned to draw the screw therein which causes the head 8 to force the sides of the clip against the inner angle walls of the yoke and the beads thereof against the walls 13 in the bore of the rounded portion 10 of the yoke.

In this manner it will be noted that the grip may be easily and securely attached to the rim 1. Also it will be noted that by turning the handle to partly unscrew the lag screw 6 the grip may be readily positioned at any desired part on the rim of the steering wheel, and likewise that the grip may be readily removed from the said wheel.

In Figure 6 of the drawings, the construction is substantially similar to that previously described, except that the handle 15 is preferably of metal and has arranged therein a heating coil 16 provided in a suitable hollow casing. In this casing there is a metal core 17 having a threaded bore for the reception of the threads of the lag screw 6'. The core 17 has one of its ends connected to one of the wires of the heating coil 16, a wire secured by a binding post 18 passing through the inner end of the metal handle 15, the second wire from the coil being directed through an eyelet 19 of insulating material which is let through the opposite side of the handle. The conductors for the heating coil may be controlled by a suitable switch (not shown). With this construction, the metal handle 15 will be maintained in a heated condition, so that the machine can be conveniently steered in wintry weather.

As disclosed by the drawings, the grip or handle is preferably arranged at an upward inclination with respect to the steering wheel, so that the same may be more readily grasped by the operator.

It is thought that the foregoing description, when taken in connection with the drawings, will fully set forth the simplicity of my construction, as well as its advantages. I, however, reserve the right to make such changes therefrom as fairly fall within the scope of what I claim.

Seated in the outer end of the handle 4 there is an electric switch of the push button type. The conductors from the elements constituting the switch are wired respectively to the ignition of the automobile and to a horn. The switch is conveniently positioned with respect to the driver, so that the horn can be sounded without necessitating the driver removing his hand from the grip.

Having described the invention, I claim:

A steering wheel and a grip extending outwardly and angularly from the rim thereof, said grip comprising a handle having a threaded bore, a yoke with which the handle is revolubly associated, and said yoke designed to be arranged on the rim of the wheel and having a bore communicating with the threaded opening in the handle, a split spring clip having beaded ends and designed to be arranged around the wheel rim and to be received in the yoke, a lag screw threaded in the handle and having its outer portion non-threaded, the sides thereof rounded inwardly and terminating in a flat head which is designed to engage the beads of the clip and to bind the latter between the rim and yoke, when the handle is turned to move the screw therein.

In testimony whereof I affix my signature.

PAUL F. GATES.